(12) United States Patent
Ota

(10) Patent No.: US 7,228,110 B2
(45) Date of Patent: Jun. 5, 2007

(54) LOW COST HIGH FREQUENCY DEVICE HAVING COMPACT MOUNTING AREA, HIGH FREQUENCY AMPLIFICATION METHOD, WIRELESS COMMUNICATION DEVICE AND MOBILE TELEPHONE INCLUDING LOW COST AND HIGH FREQUENCY CIRCUIT HAVING COMPACT MOUNTING AREA

(75) Inventor: Yorito Ota, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 853 days.

(21) Appl. No.: 10/677,490

(22) Filed: Oct. 3, 2003

(65) Prior Publication Data

US 2004/0127169 A1 Jul. 1, 2004

(30) Foreign Application Priority Data

Oct. 4, 2002 (JP) .............................. 2002-292336

(51) Int. Cl.
*H04B 1/40* (2006.01)

(52) U.S. Cl. .................. 455/84; 455/82; 455/306; 455/303; 455/102; 455/106; 455/311; 327/379; 327/427; 333/101; 375/240.16; 375/240.01

(58) Field of Classification Search .................. 455/83, 455/106, 102, 306, 303, 311, 127.3, 82; 327/419; 375/240.16, 240.01
See application file for complete search history.

(56) References Cited

U.S. PATENT DOCUMENTS

| 5,377,255 | A | | 12/1994 | Beasley |
| 5,722,040 | A | | 2/1998 | Bjerede et al. |
| 5,726,980 | A | * | 3/1998 | Rickard ....................... 370/293 |
| 6,233,444 | B1 | * | 5/2001 | Nakanishi .................... 455/313 |
| 6,443,641 | B2 | * | 9/2002 | Takamori et al. ........... 396/579 |
| 6,806,774 | B2 | * | 10/2004 | Sakuno ........................ 330/296 |
| 6,885,855 | B1 | * | 4/2005 | Vuoppola .................... 455/306 |
| 6,904,266 | B1 | * | 6/2005 | Jin et al. ....................... 455/20 |
| 6,909,883 | B2 | * | 6/2005 | Fujiwara ...................... 455/84 |

FOREIGN PATENT DOCUMENTS

| JP | 57-131016 | 8/1982 |
| JP | 59-140560 | 9/1984 |
| JP | 05-083155 | 4/1993 |
| JP | 08-065198 | 3/1996 |
| JP | 09-130292 | 5/1997 |
| JP | 09-505450 | 5/1997 |
| JP | 11-074819 | 3/1999 |
| JP | P2003-188761 A | 7/2003 |
| WO | WO 95/14331 | 5/1995 |

* cited by examiner

*Primary Examiner*—Marceau Milord
(74) *Attorney, Agent, or Firm*—McDermott Will & Emery LLP

(57) ABSTRACT

A high frequency device includes a transmission/reception amplifier 13 that amplifies and outputs an input signal, and a transmission/reception switch 2 that gang switches internally so that during transmission an input of the transmission/reception amplifier 13 is connected to an up mixer and an output of the transmission/reception amplifier 13 is connected to an antenna unit 5, and so that during reception the output of the transmission/reception amplifier 13 is connected to a down mixer and the input of the transmission/reception amplifier 13 is connected to the antenna unit 5.

15 Claims, 12 Drawing Sheets

LOW COST HIGH FREQUENCY DEVICE HAVING COMPACT MOUNTING AREA, HIGH FREQUENCY AMPLIFICATION METHOD, WIRELESS COMMUNICATION DEVICE AND MOBILE TELEPHONE INCLUDING LOW COST AND HIGH FREQUENCY CIRCUIT HAVING COMPACT MOUNTING AREA

BACKGROUND OF THE INVENTION (1) Field of the Invention

The present invention relates to a technique for wireless communication using high frequency, and in particular to the structure of a high frequency circuit that amplifies a high frequency signal.

(2) Description of the Related Art

With the rapid spread of mobile telephones in recent years, techniques relating to high frequency devices and high frequency circuits have advanced dramatically. Such advances are followed year by year with improved performance and reduced size and cost of wireless communication devices such as mobile telephones.

In addition, with the integration of conventional computer terminals and mobile telephones, wireless LAN (local area network) systems that perform high speed data communication are also rapidly entering into widespread use. Such wireless LANs are one type of broadband communication, and currently support high speed data transfer of several hundred kilobits to several tens of megabits per second, using a frequency band of approximately 2 GHz to 5 GHz. Such broadband communication enables distribution of high-definition moving images and the like.

The structure of a high frequency circuit in a wireless communication device used in a wireless LAN system is approximately the same as that of a high frequency circuit in a mobile telephone. FIG. 1 shows the structure of a conventional high frequency circuit. An antenna unit 5 is composed of antennas 51 and 52, and an antenna switch 53. This is a diversity structure that uses a lateral antenna that is highly sensitive. The transmission/reception switch 9 switches the antenna unit 5 to be connected to a transmission circuit or a reception circuit. The transmission/reception switch 9 is necessary in time division duplex (TDD), which is generally employed in wireless LAN systems to use the same frequency for both transmission and reception. A BPF (bandpass filter) 43 used for reception reduces unnecessary band components in signals received by the antenna unit 5. An LNA (low-noise amplifier) 12 amplifies an input signal, so that the amplified signal is low in noise, and outputs the amplified signal to a down mixer. A PA (power amplifier) 11 amplifies, to high output, a signal sent from an up mixer. BPFs 41 and 42 reduce unnecessary band components before and after the PA, respectively.

Details about wireless LANs can be found in "*Musen Akusesu Gijutsu* (Wireless Access Technologies)", Journal of IEICE, February 2001, pp. 105-111. Furthermore, details about antenna diversity, and the structure of the filter and the transmission/reception unit can be found in Journal of IEICE, November 2001, pp. 775-789 and pp. 796-802.

Since there are instances in which a high power signal is input into the LNA in the high frequency circuit of a wireless communication device used in a wireless LAN system, it is necessary to use an amplifier with a large saturation output to prevent signal distortion due to amplification by the LNA in nonlinear areas. As a result, amplifiers with approximately the same output are used for the LNA and the PA.

The expense of active elements such as the LNA and the PA contributes to high costs of high frequency circuits. Furthermore, the component size of high-output amplifiers is a hindrance in producing circuits that can be mounted compactly.

SUMMARY OF THE INVENTION

A first object of the present invention is to provide a low-cost wireless communication device for use in a wireless LAN system. Furthermore, a second object is to provide a low-cost, compact high frequency device for use in a wireless LAN system. In addition, a third object is to provide a high frequency amplification method used in a wireless communication system, that enables production of a low-cost, compact high frequency circuit. Furthermore, a fourth object is to provide a low-cost, compact mobile telephone.

In order to achieve the stated objects, the wireless communication device of the present invention is a wireless communication apparatus that communicates in a wireless LAN with use of time division duplex, including: a modulation/demodulation circuit that, during transmission, modulates a baseband signal to an intermediate frequency signal, and, during reception, demodulates an intermediate frequency signal to a baseband signal; a mixer circuit that is connected to an intermediate frequency circuit and a high frequency circuit, and with use of a superheterodyne method, during transmission, raises the intermediate frequency signal to a high frequency signal, and during reception, lowers a high frequency signal to the intermediate frequency signal; the high frequency circuit of which, during transmission, an input is connected to a mixer circuit and an output is connected to an antenna circuit, and, during reception, the input is connected to the antenna circuit and the output is connected to the mixer circuit, and that, during transmission and reception, amplifies an input high frequency signal and outputs a resultant amplified signal; and an antenna circuit that emits and receives carrier waves.

According to the stated structure, in a wireless LAN in which an LNA and a PA are required to have approximately the same saturation output, the amplifier of the high frequency circuit can be used to amplify a signal both during reception and transmission.

As a result, since it is unnecessary to provide a PA and an LNA separately, the number of components in the high frequency circuit is reduced, and a low-cost wireless communication device for use in a wireless LAN system can be realized.

In order to achieve the stated objects, the high frequency device of the present invention is a high frequency device that amplifies a high frequency signal to be transmitted and a received high frequency signal, in a wireless communication system in which time division duplex is used, including: one high frequency amplification unit; and a switch unit operable to switch to a transmission connection state during transmission and to a reception connection state during reception, wherein in the transmission connection state, the switch unit connects an input of the high frequency amplification unit to an up mixer, the up mixer raising an intermediate frequency signal to a high frequency signal, and connects an output of the high frequency amplification unit to an antenna circuit, and in the reception connection state, the switch unit connects the input of the high frequency amplification unit to the antenna circuit, and connects the output of the high frequency amplification circuit to a down mixer, the down mixer lowering a high frequency signal to an intermediate frequency signal.

According to the stated structure, it is unnecessary to provide separately an amplifier (PA) for amplifying a transmission signal raised to a high frequency by an up mixer and an amplifier (LNA) for amplifying a reception signal received by an antenna circuit. Therefore, one high frequency amplifying unit can be used for amplifying both a transmission signal and a reception signal.

As a result, the number of amplifiers, which require numerous active elements, can be reduced, and a low-cost high frequency device having a compact mounting area for used in a wireless LAN system can be realized.

Furthermore, the switch unit may include a first switch and a second switch, the first switch, in the transmission connection state, receiving input of a signal from the up mixer and outputting the signal to the input of the high frequency amplification unit, and, in the reception connection state, receiving input of a signal from the antenna circuit and outputting the signal to the input of the high frequency amplification unit, and the second switch, in the transmission connection state, receiving input of a signal from the output of the high frequency amplification unit and outputting the signal to the antenna circuit, and, in the reception connection state, receiving input of a signal from the output of the high frequency amplification unit and outputting the signal to the down mixer.

According to the stated structure, the switching unit switches the signal input into the high frequency amplifying unit between a signal that has been raised by the up mixer to a high frequency signal and a signal received by the antenna circuit, and switches an output-destination of the signal amplified by the high frequency amplifying unit between the antenna circuit and the down mixer. Therefore the high frequency amplifying unit is able to be used for both transmission and reception.

As a result, the number of components is reduced, and a low-cost, compact high frequency device can be realized.

Furthermore, a final high frequency amplification unit may be provided on a transmission path via which a signal is transmitted from the second switch to the antenna circuit in the transmission connection state, and may be operable to amplify the signal transmitted via the path.

According to the stated structure, the high frequency amplification unit and the final amplification unit compose a multistage amplifier (PA) that amplifies a transmission signal, and the high frequency amplification unit, which is part of the multistage amplifier (PA), can also be used as an amplifier (LNA) for amplifying a reception signal.

As a result, in a wireless LAN system in which a greater output power is required from the PA than the LNA, the number of active components used in the amplifiers overall can be reduced, and a low-cost, compact high frequency device can be realized.

Furthermore, the high frequency device may further include: one transmission/reception filter unit provided on a common section of the transmission path via which a signal is transmitted from the second switch to the antenna circuit in the transmission connection state, and a transmission path via which a signal is transmitted from the antenna circuit to the first switch in the reception connection state, and operable to attenuate, from a signal transmitted via the section, a signal of unnecessary bandwidth.

According to the stated structure, it is not necessary to provide separately a filter for removing unnecessary band signals from the transmission signal output to the antenna circuit during transmission and a filter for removing unnecessary band signals from the reception signal received by the antenna circuit during reception. Consequently, one transmission/reception filtering unit can be used to remove unnecessary band signals from both the transmission signal and the reception signal.

As a result, the number of active components and the number of filters are reduced, and an even lower-cost, more compact high frequency device can be realized.

Furthermore, the high frequency device may further include: an input signal filter unit provided on a transmission path via which a signal is transmitted from the first switch to the high frequency amplification unit, and operable to attenuate, from the signal transmitted via the transmission path, a signal of unnecessary bandwidth; and an output signal filter unit provided on a transmission path via which a signal is transmitted from the high frequency amplification unit to the second switch, and operable to attenuate, from the signal transmitted via the transmission path, a signal of unnecessary bandwidth.

According to the stated structure, unnecessary band components are removed by the input signal filter unit during transmission from a transmission signal that has been raised to a high frequency by the up mixer, and during reception from a reception signal received by the antenna circuit. Furthermore, unnecessary band signals are removed by the output signal filter during transmission from an amplified transmission signal that is transmitted from the antenna circuit, and during reception from an amplified reception signal that is input to a down mixer for lowering to an intermediate frequency.

Furthermore, the high frequency amplification unit and the switch unit may be formed on one semiconductor chip.

According to the stated structure, the high frequency device can be realized with one semiconductor chip. As a result, the size of the mounting area is reduced and a compact high frequency device can be realized.

Furthermore, the antenna circuit may have a diversity function.

According to the stated structure, the number of active elements is reduced, and a high frequency device can be realized that is capable of received and transmitting signals with use of a highly sensitive antenna.

In order to achieve the stated objects, the high frequency amplification method of the present invention amplifies a high frequency signal to be transmitted and a received high frequency signal with use of a high frequency amplification device, in a wireless communication system in which time division duplex is used, the method including: a connection step of, during transmission, gang connecting an input of the high frequency amplification unit to an up mixer, the up mixer raising an intermediate frequency signal to a high frequency signal, and an output of the high frequency amplification unit to an antenna circuit, and during reception, gang connecting the input of the high frequency amplification unit to the antenna circuit, and the output of the high frequency amplification circuit to a down mixer, the down mixer lowering a high frequency signal to an intermediate frequency signal; and an amplification step of amplifying a signal input into the high frequency device.

According to the stated method, one high frequency amplification unit can be used during transmission to amplify a transmission signal raised by the up mixer to a high frequency signal, and during reception to amplify a reception signal received by the antenna.

As a result, by using the high frequency amplification method, the number of amplifier components is reduced, thereby realizing high frequency wireless communication in a low-cost, compact high frequency device.

In order to achieve the stated objects, the mobile telephone of the present invention a mobile telephone that performs wireless communication in a wireless communication system in which time division duplex is used, including: one high frequency amplification unit; and a switch unit operable to switch to a transmission connection state during transmission and to a reception connection state during reception, wherein in the transmission connection state, the switch unit connects an input of the high frequency amplification unit to an up mixer, the up mixer raising an intermediate frequency signal to a high frequency signal, and connects an output of the high frequency amplification unit to an antenna circuit, and in the reception connection state, the switch unit connects the input of the high frequency amplification unit to the antenna circuit, and connects the output of the high frequency amplification circuit to a down mixer, the down mixer lowering a high frequency signal to an intermediate frequency signal.

According to the stated structure, it is unnecessary to provide separately an amplifier (PA) for amplifying a transmission signal raised to a high frequency by an up mixer and an amplifier (LNA) for amplifying a reception signal received by an antenna circuit. Therefore, one high frequency amplifying unit can be used for amplifying both a transmission signal and a reception signal.

As a result, the number of amplifiers, which require numerous active elements, can be reduced, and a low-cost, compact mobile telephone can be realized.

Furthermore, the switch unit may include a first switch and a second switch, the first switch, in the transmission connection state, receiving input of a signal from the up mixer and outputting the signal to the input of the high frequency amplification unit, and, in the reception connection state, receiving input of a signal from the antenna circuit and outputting the signal to the input of the high frequency amplification unit, and the second switch, in the transmission connection state, receiving input of a signal from the output of the high frequency amplification unit and outputting the signal to the antenna circuit, and, in the reception connection state, receiving input of a signal from the output of the high frequency amplification unit and outputting the signal to the down mixer.

According to the stated structure, the switching unit switches the signal input into the high frequency amplifying unit between a signal that has been raised by the up mixer to a high frequency signal and a signal received by the antenna circuit, and switches an output-destination of the signal amplified by the high frequency amplifying unit between the antenna circuit and the down mixer. Therefore the high frequency amplifying unit is able to be used for both transmission and reception.

As a result, the number of components is reduced, and a low-cost, compact mobile telephone can be realized.

Furthermore, the mobile telephone may further include: a final high frequency amplification unit provided on a transmission path via which a signal is transmitted from the second switch to the antenna circuit in the transmission connection state, and operable to amplify the signal transmitted via the path.

According to the stated structure, the high frequency amplification unit and the final amplification unit compose a multistage amplifier (PA) that amplifies a transmission signal, and the high frequency amplification unit, which is part of the multistage amplifier (PA), can also be used as an amplifier (LNA) for amplifying a reception signal.

As a result, the total number of active elements used in the amplifiers overall can be reduced, and a low-cost, compact mobile telephone can be realized.

Furthermore, the mobile telephone may further include: one transmission/reception filter unit provided on a common section of the transmission path via which a signal is transmitted from the second switch to the antenna circuit in the transmission connection state, and a transmission path via which a signal is transmitted from the antenna circuit to the first switch in the reception connection state, and operable to attenuate, from a signal transmitted via the section, a signal of unnecessary bandwidth.

According to the stated structure, it is not necessary to provide separately a filter for removing unnecessary band signals from the transmission signal output to the antenna circuit during transmission and a filter for removing unnecessary band signals from the reception signal received by the antenna circuit during reception. Consequently, one transmission/reception filtering unit can be used to remove unnecessary band signals from both the transmission signal and the reception signal.

As a result, the number of active components and the number of filters are reduced, and an even lower-cost, more compact mobile telephone can be realized.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Figure 2:
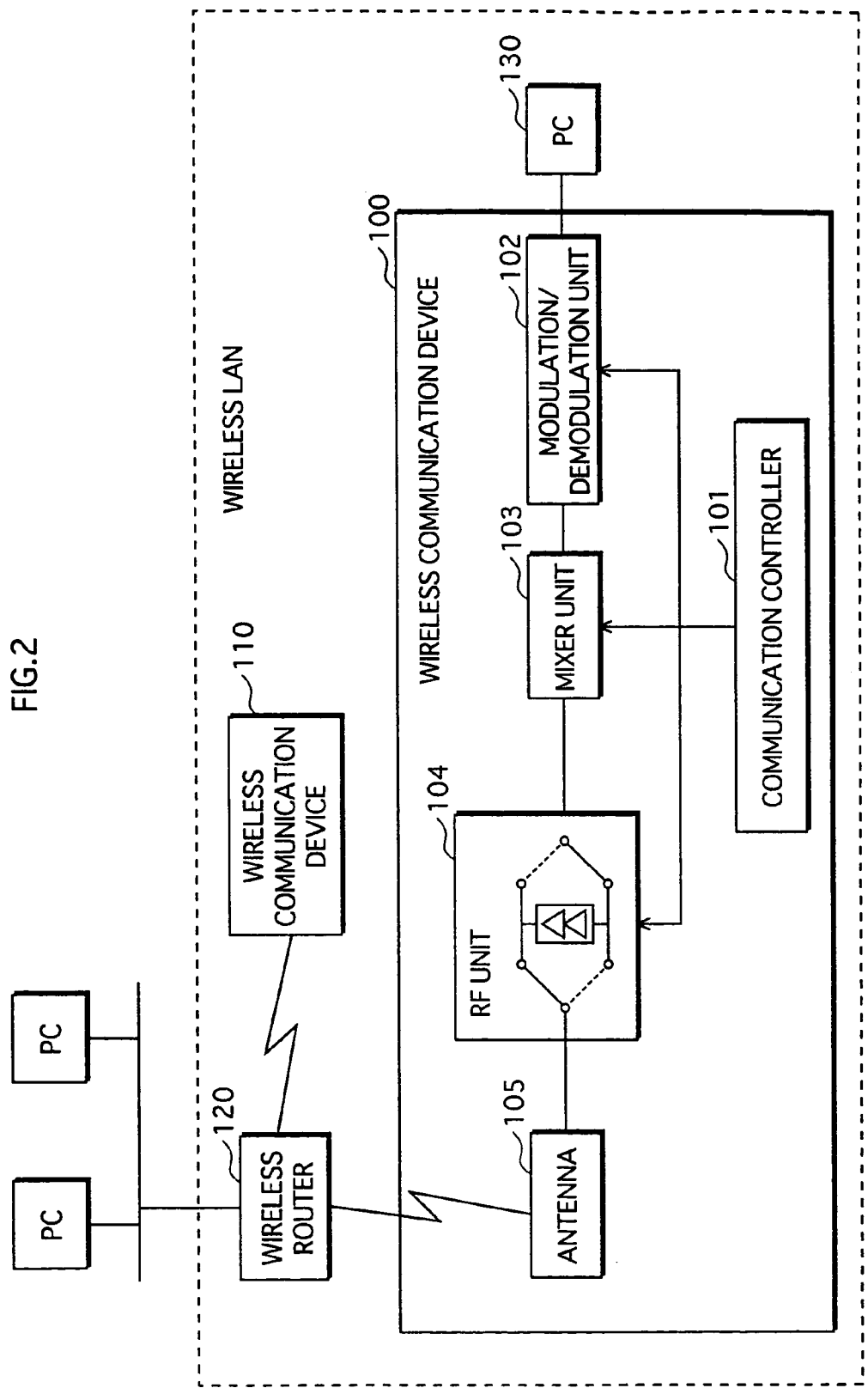
FIG. 2 shows a wireless LAN that includes a wireless communication device 100 of the present invention.
Figure 12:
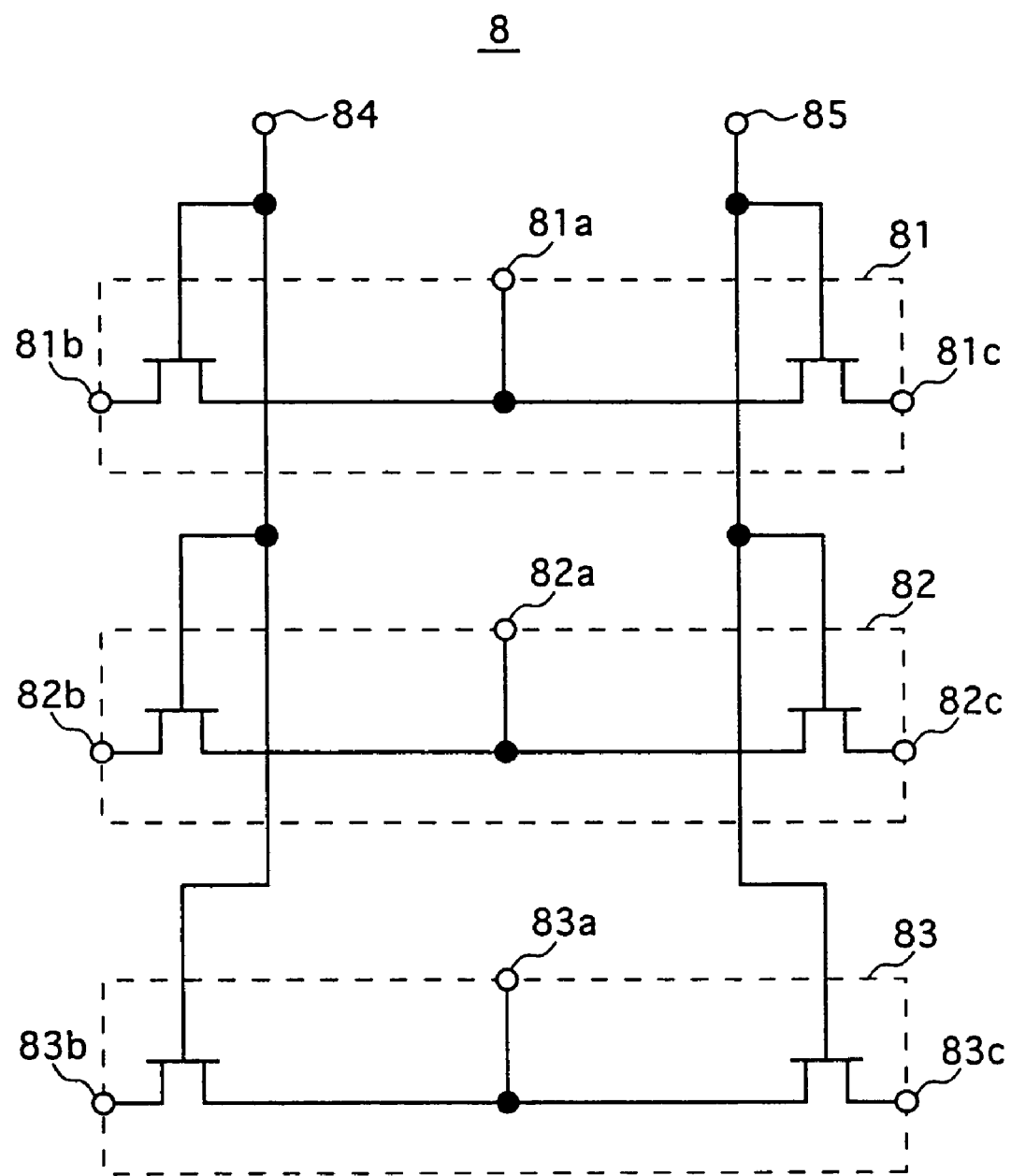
FIG. 12 shows a structure using non-contact switches in a transmission/reception switch 8.

The following describes preferred embodiments of the present invention with use of FIG. 2 through to FIG. 12.

FIG. 2 shows a wireless LAN that includes a wireless communication device 100 of the present embodiment. The wireless LAN shown in FIG. 2 is composed of wireless communication devices 100 and 110 and a wireless router 120, which are connected according to TDD wireless communication.

The wireless router 120 is an access point that connected a wired LAN and a wireless LAN, and has a routing function.

The wireless communication device 100 is a so-called wireless LAN interface card, and is used mounted in a PC 130. The wireless communication device 100 is composed of a communication controller 101, a modulation/demodulation unit 102, a mixer unit 103, an RF unit 104, and an antenna unit 105.

The communication controller 101 is a function block that controls transmission and reception cycles in the modulation/demodulation unit 102, the mixer unit 103 and the RF unit 104, by dividing a time axis into transmission periods and reception periods following specifications of IEEE802.11 (Institute of Electrical and Electronic Engineers 802.11).

The modulation/demodulation unit 102 is a function block that modulates an intermediate frequency (IF) in accordance with a baseband signal, and demodulates a baseband signal from an IF signal.

During transmission, the modulation/demodulation unit 102 obtains from the PC 130 a baseband signal that includes data to be transmitted, modulates an IF signal in accordance with the obtained baseband signal, and outputs the resultant signal to the mixer unit 103. Conversely, during reception, the modulation/demodulation unit 102 demodulates a baseband signal from an IF signal obtained from the mixer unit 103, and outputs the resultant signal to the PC 130.

The mixer unit 103 includes a local oscillation circuit, an up mixer, and a down mixer, and is a function block that performs frequency conversion between IF and radio frequency (RF) signals. During transmission, the mixer unit 103 raises an IF signal received from the modulation/demodulation unit 102 to an RF signal, by mixing the IF signal in the up mixer with a local oscillation signal generated by the local oscillation circuit, and outputs the resultant signal to the RF unit 104. Conversely, during reception, the mixer unit 103 lowers an RF signal received from the RF unit 104 to an IF signal, by mixing the RF signal in the down mixer with a local oscillation signal generated by the local oscillation circuit, and outputs the resultant signal to the modulation/demodulation unit 102.

The RF unit 104 includes an amplifier and a path switch, and is a function block that amplifies an input RF signal. During transmission, an input of the RF unit 104 is connected to the mixer unit 103, an output of the RF unit 104 is connected to the antenna unit 105, the RF unit 104 thereby amplifying the RF signal input from the mixer unit 103 and outputting the amplified RF signal to the antenna unit 105. Conversely, during reception, the input is connected to the antenna unit 105, and the output is connected to the mixer unit 103, the RF unit 104 thereby amplifying the RF signal input from the antenna unit 105 and outputting the amplified RF signal to the mixer unit 103.

Furthermore, the RF unit 104 further includes a bandpass filter, and removes unnecessary band components from the RF signal.

During transmission, the antenna unit 105 emits, as a radio wave, the RF signal received from the RF unit 104 to the wireless router 120. During reception, the antenna 105 outputs an RF signal induced according to reception of a radio wave from the wireless router 120 to the RF unit 104.

According to the described structure, data output by the PC 130 is emitted as an electromagnetic wave from the antenna 105 after passing through the modulation/demodulation unit 102, the mixer unit 103, and the RF unit 104, in the stated order. Conversely, a signal received from the wireless router 120 according to an electromagnetic wave is output to the PC 130 after passing through, in the stated order, the antenna unit 105, the RF unit 104, and the mixer unit 103, and being demodulated in the modulation/demodulation unit 102.

In the wireless LAN, there are cases in which a high power signal is input into the LNA of the wireless transmission device, and approximately the same saturation output is required from the LNA and the PA. To this end, the RF unit 104 uses its internal amplifier as a PA during transmission and an LNA during reception by reversing the connection orientation of its input and output terminals between the modulation/demodulation unit 102 and the antenna unit 105, depending on the orientation with which the signal is transmitted. In this way, the number of components can be reduced by using the amplifier as both a PA and an LNA.

Note that the wireless LAN in the present embodiment operates in an infrastructure mode, but may instead operate in an ad-hoc mode in which the wireless communication device 100 and the wireless communication device 110 directly connect to each other.

Furthermore, the present invention may be applied to a wireless communication unit of a wireless LAN access point such as the wireless router 120.

The following describes the high frequency device used in the RF unit 104 that is the characteristic part of the present invention.

Figure 3:
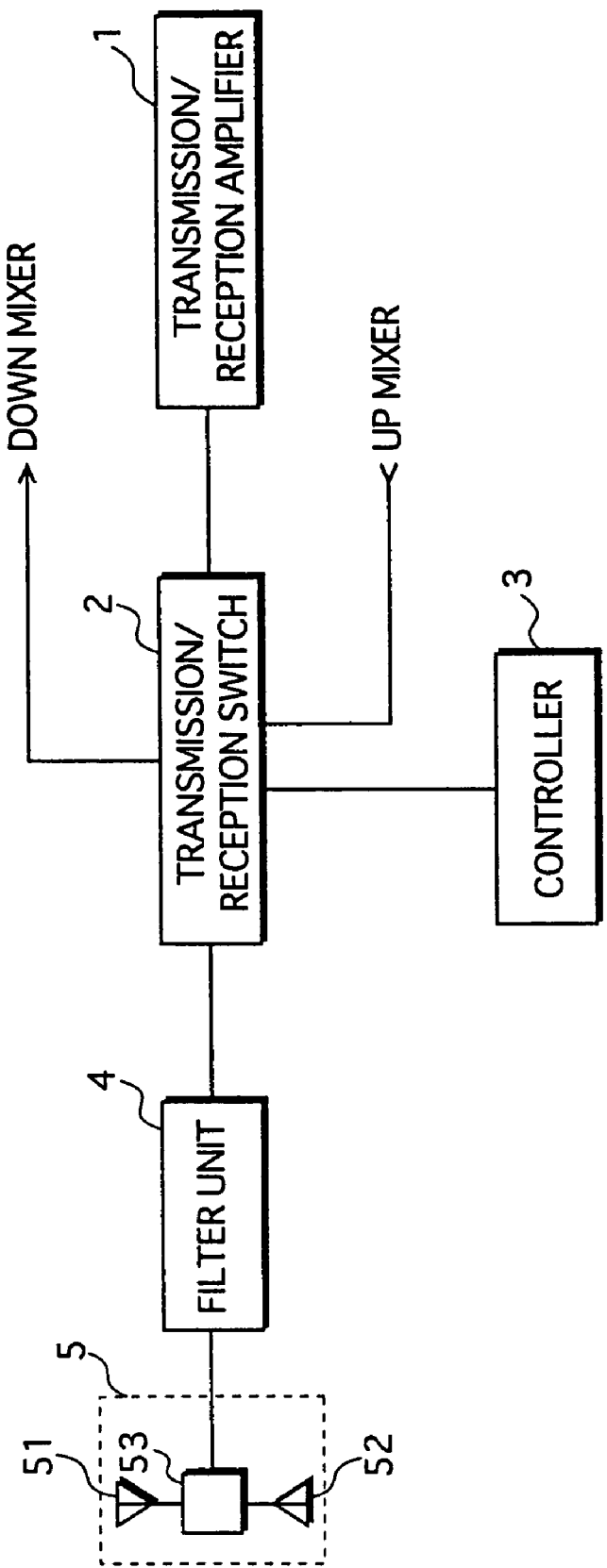
FIG. 3 is a block drawing showing a high frequency device of the present invention.

FIG. 3 is a block drawing showing the structure of the high frequency device of an embodiment of the present invention. The high frequency device of the present embodiment is composed of a transmission/reception amplifier 1, a transmission/reception switch 2, a controller 3 and a filter unit 4.

FIG. 3 also shows an antenna unit 5 in addition to the function blocks that compose the high frequency device.

The transmission/reception amplifier 1 is a multistage amplifier that uses an active element, and linearly amplifies and outputs a received signal. Note that in the present specification input/output to/from the amplifier denote input of an RF signal to the amplifier and output of an RF signal from the amplifier, respectively.

The transmission/reception switch 2 includes contact switches such as relays, or non-contact switches such as transistors, and switches the connection of the circuit of the transmission/reception amplifier 1 between a transmission state and a reception state. In the transmission state, the input terminal of the transmission/reception amplifier 1 is connected to an up mixer (not illustrated), and the output terminal of the transmission/reception amplifier 1 is connected to the antenna unit 5. In the reception state, the output terminal of the transmission/reception amplifier 1 is connected to a down mixer (not illustrated) and the input terminal of the transmission/reception amplifier 1 is connected to the antenna unit 5.

Figure 4:
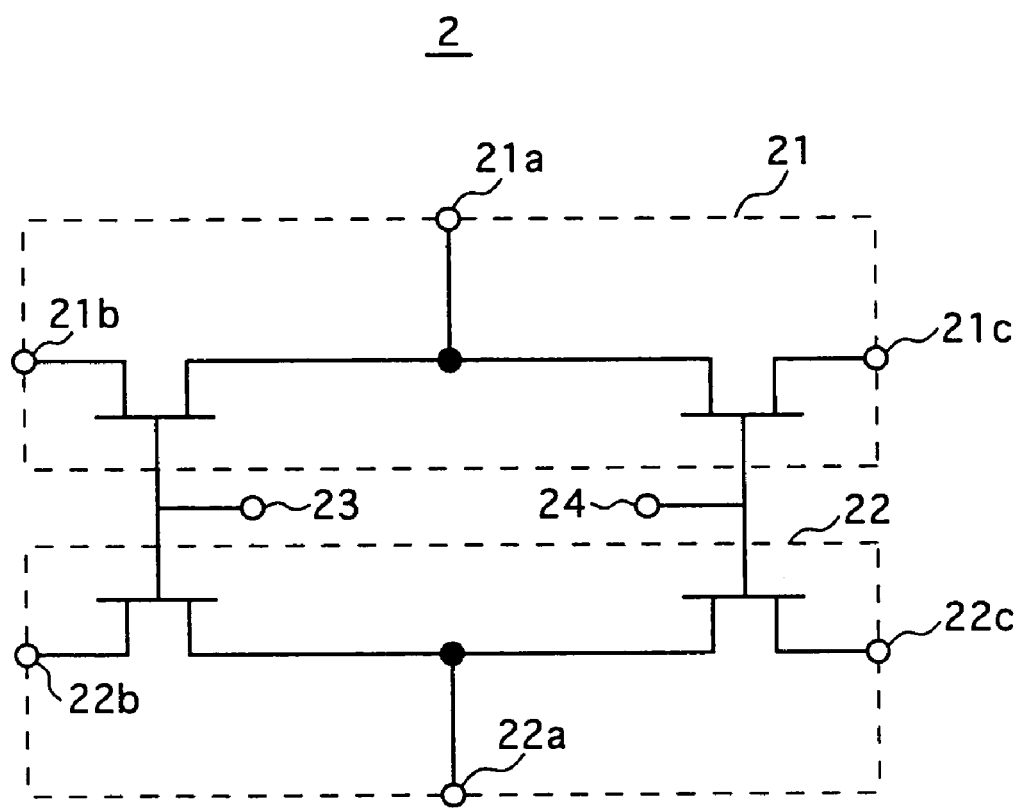
FIG. 4 shows an example of a structure using non-contact switches in a transmission/reception switch 2.

FIG. 4 shows an example of the transmission/reception switch 2 with a structure that uses non-contact switches. The transmission/reception switch 2 is composed of internal switches 21 and 22, which are single pole double throw (SPDT) switches. The internal switches 21 and 22 gang switch by sharing the gate terminals 23 and 24. Furthermore, each of the internal switches 21 and 22 is composed of two transistors. In the internal switch 21, a terminal 21a is connected to an input terminal of the transmission/reception amplifier 1, a terminal 21b is connected to an up mixer side of the circuit, and a terminal 21c is connected to an antenna unit 5 side of the circuit. In the internal switch 22, a terminal 22a is connected to an output terminal of the transmission/reception amplifier 1, a terminal 22b is connected to the antenna unit 5 side of the circuit, and a terminal 22c is connected to a down mixer side of the circuit.

The gate terminals 23 and 24 are connected to the controller 3, and in each of the internal switches 21 and 22 a signal is transmitted by the transistor that is on the side of the gate terminal to which the gate voltage is being applied.

Specifically, when a gate voltage is applied to the gate terminal 23, in the internal switch 21, the circuit is conductive between the terminal 21a and the terminal 21b, and non-conductive between the terminal 21a and the terminal 21c. Accordingly, the signal is transmitted from the up mixer side of the circuit to the input terminal. Furthermore, in the internal switch 22, the circuit is conductive between the terminal 22a and the terminal 22b, and non-conductive between the terminal 22a and the terminal 22c. Accordingly, the signal is transmitted from the transmission/reception amplifier 1 output terminal to the antenna unit 5. When a gate voltage is applied to gate terminal 24, in the internal switch 21, the circuit is conductive between the terminal 21a and the terminal 21c, and non-conductive between the terminal 21a and the terminal 21b. Accordingly, the signal is transmitted from the antenna unit 5 side of the circuit to the transmission reception amplifier 1 input terminal. Furthermore, in the internal switch 22, the circuit is conductive between the terminal 22a and the terminal 22c, and non-conductive between the terminal 22a and the terminal 22b. Accordingly, the signal is transmitted from the transmission/reception amplifier 1 output terminal to the down mixer side of the circuit.

Note that isolation between the terminals 21b and 21c and between the terminals 22b and 22c can be ensured by applying a gate voltage to only one of the gate terminal 23 and the gate terminal 24.

Figure 5:
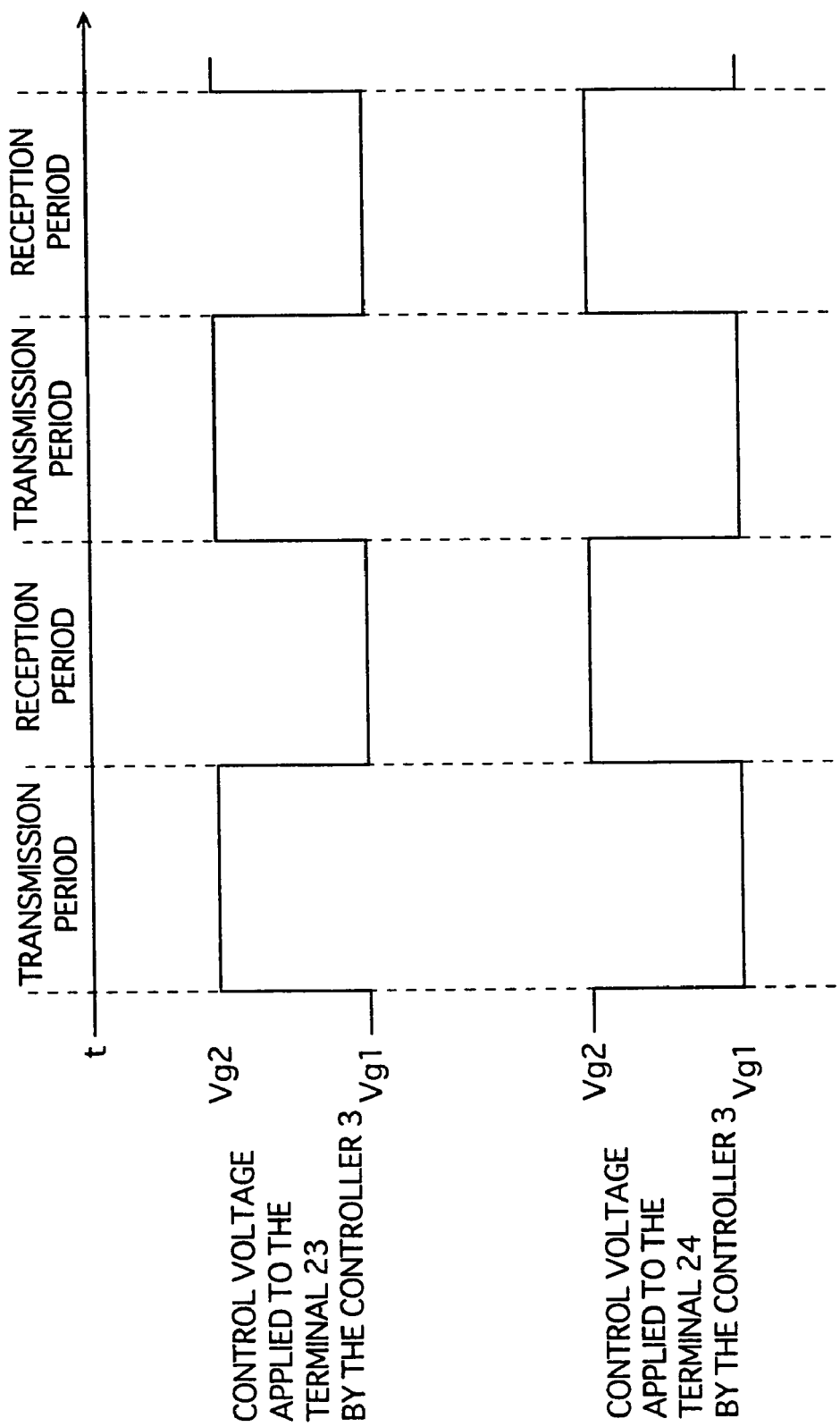
FIG. 5 shows timing of control for switching the switch 2, in the controller 3 of the present embodiment.

The controller 3 is a function block that controls the connection state of the transmission/reception switch 2 by switching a control voltage which it applies to the transmission/reception switch 2, in compliance with timing of transmission and reception. Specifically, the controller 3 obtains the timing of the transmission and reception periods from the communication controller 101 which controls communication by dividing a time axis into transmission periods and reception periods according to TDD as specified in IEEE 802.11. As shown in FIG. 5, during transmission periods the controller 3 applies a high gate voltage to the terminal 23 and a low voltage to the terminal 24, and during reception periods the controller 3 applies high gate voltage to the terminal 24 and a low gate voltage to the gate 23. Note that wireless LAN communication control specified in IEEE 802.11 is well known, and therefore a detailed description thereof is omitted here.

The filter unit 4 is a filter, such as a bandpass filter, that removes unnecessary band components from a signal transmitted on a transmission path. The antenna unit 5 has a diversity function and includes an antenna 51, an antenna 52, and an antenna switch 53.

The following describes an embodiment of the high frequency device of the present invention.

Figure 6:
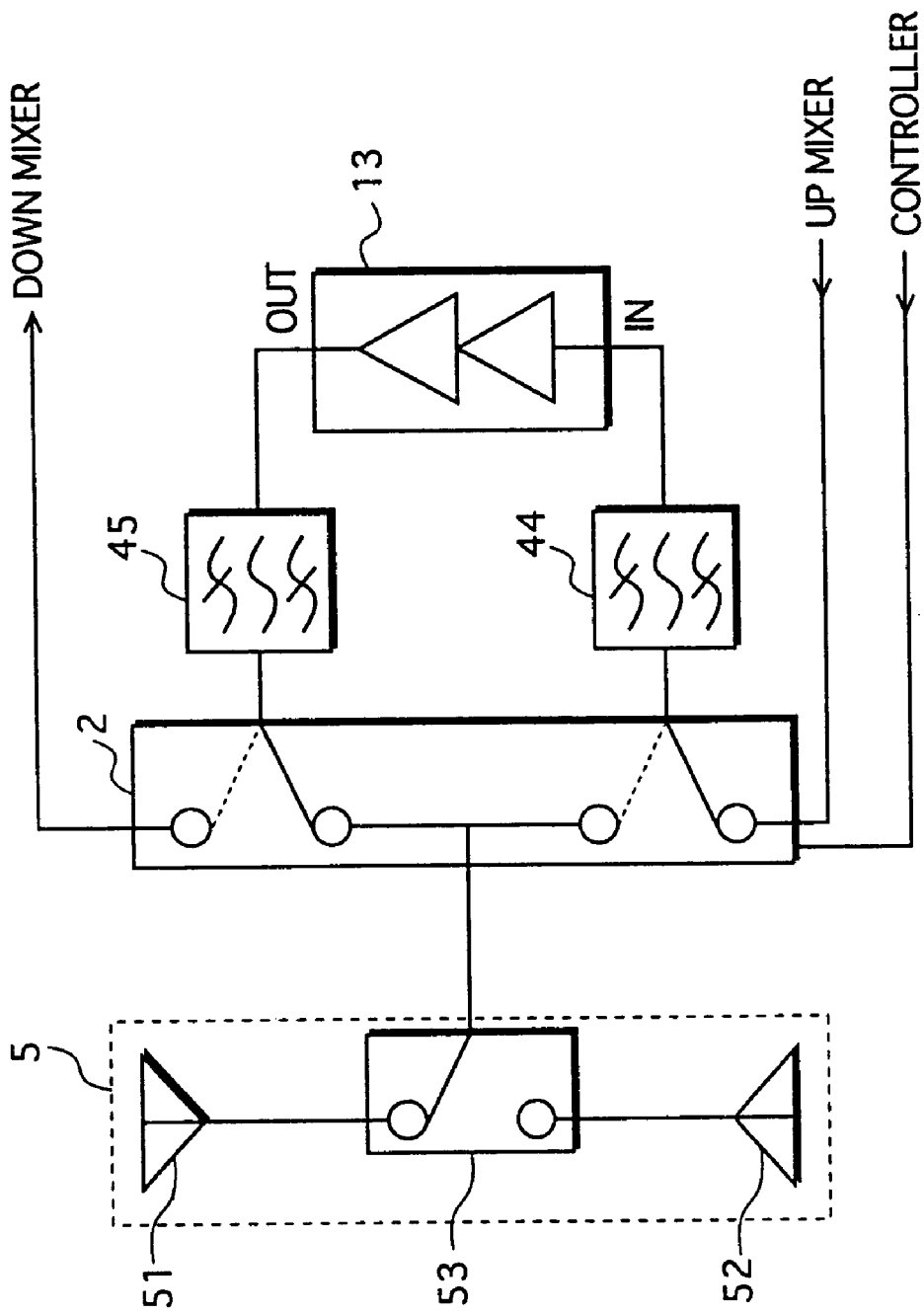
FIG. 6 shows a high frequency device of a first embodiment of the present invention.

FIG. 6 shows the high frequency device of the first embodiment of the present invention. The high frequency device of the first embodiment includes a transmission/reception amplifier 13, a transmission/reception switch 2, a BPF 44, a BPF 45, and an antenna 5.

The transmission/reception amplifier 13 is a multistage amplifier that uses active elements, and linearly amplifies and outputs a received signal. The transmission/reception switch 2 has the internal structure shown in FIG. 4. During transmission, under the control of the controller 3, the transmission/reception switch 2 connects the input terminal of the transmission/reception amplifier 13 to the up mixer, and connects the output terminal of the transmission/reception amplifier 13 to the antenna unit 5. On the other hand, during reception, the transmission/reception switch 2 connects the input terminal of the transmission/reception amplifier 13 to the antenna unit 5 and connects the output terminal of the transmission/reception amplifier 13 to the down mixer. The BPF 44 removes unnecessary band components from the signal to be input to the transmission/reception amplifier 13. The BPF 45 removes unnecessary band components from the signal output by the transmission/reception amplifier 13. The antenna unit 5 has a diversity function.

According to the stated structure, the transmission/reception amplifier 1 functions as a PA during transmission, and functions as an LNA during reception. Consequently, the number of components for the amplifiers, which require numerous active elements, can be reduced.

The following describes further embodiments of the present invention. In the following embodiments, structure that has the same function that in the first embodiment has the same numbering thereas, and a description thereof is omitted.

Figure 7:
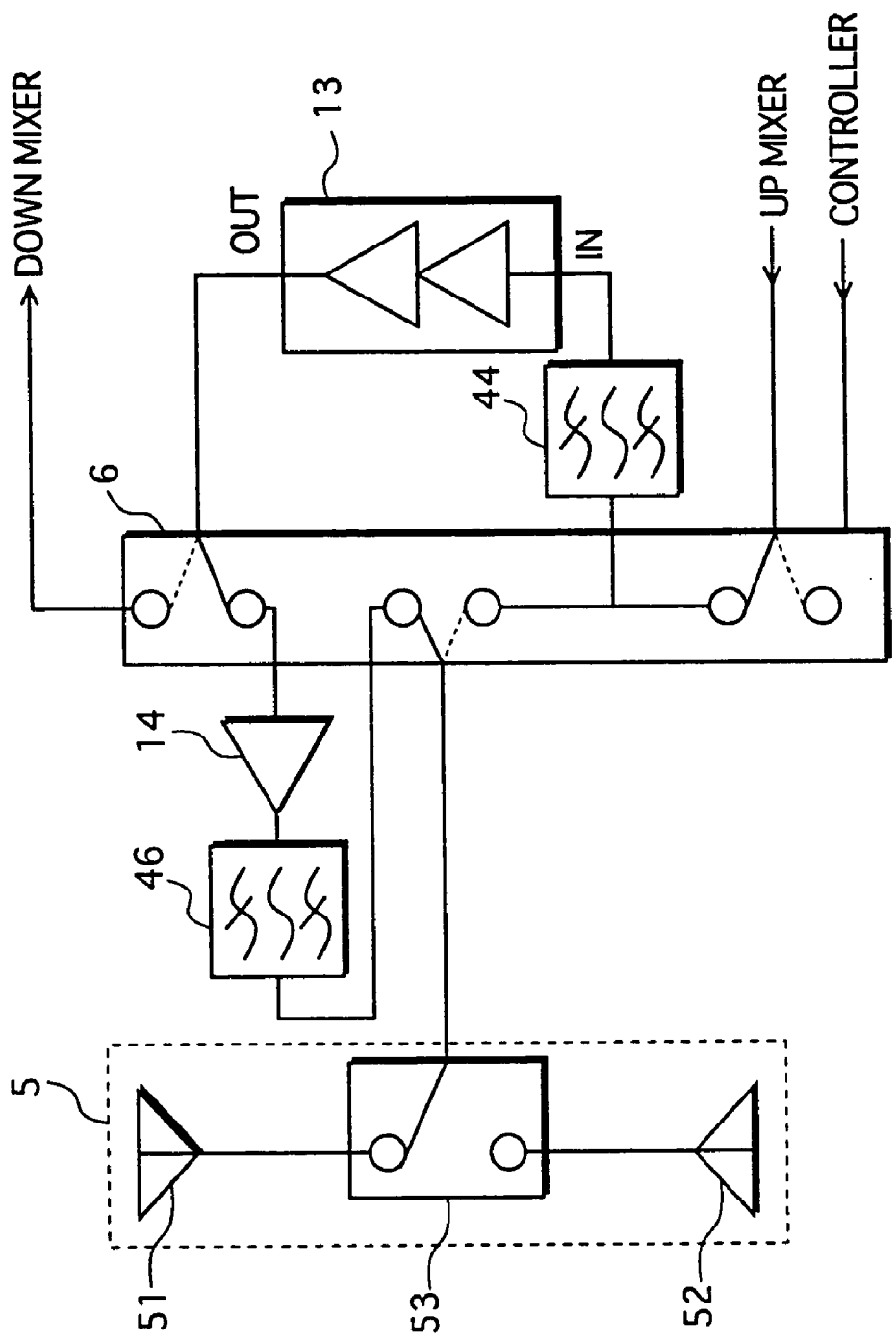
FIG. 7 shows a high frequency device of a second embodiment of the present invention.

FIG. 7 shows the high frequency device of a second embodiment of the present invention. The high frequency device of the second embodiment is for use in a wireless communication system in which output by the PA is required to be greater than that by the LNA. In the high frequency device of the second embodiment, a transmission/reception switch 6 replaces the transmission/reception switch 2 of the first embodiment, the BPF 45 is absent, and a final amplifier 14 and a BPF 46 are additionally included.

Under the control of the controller 3, during transmission, the transmission/reception switch 6 gang switches internally to connect the up mixer to the input terminal of the transmission/reception amplifier 13, connects the output terminal of the transmission/reception amplifier 13 to the input terminal of the final amplifier 14, and connects the antenna unit 5 to the output terminal of the final amplifier 14. On the other hand, during reception, the transmission/reception switch 6 makes input from the up mixer non-conductive, connects the output terminal of the transmission/reception amplifier 13 to the down mixer, and connects the antenna 5 to the input terminal of the transmission/reception amplifier 13.

Figure 8:
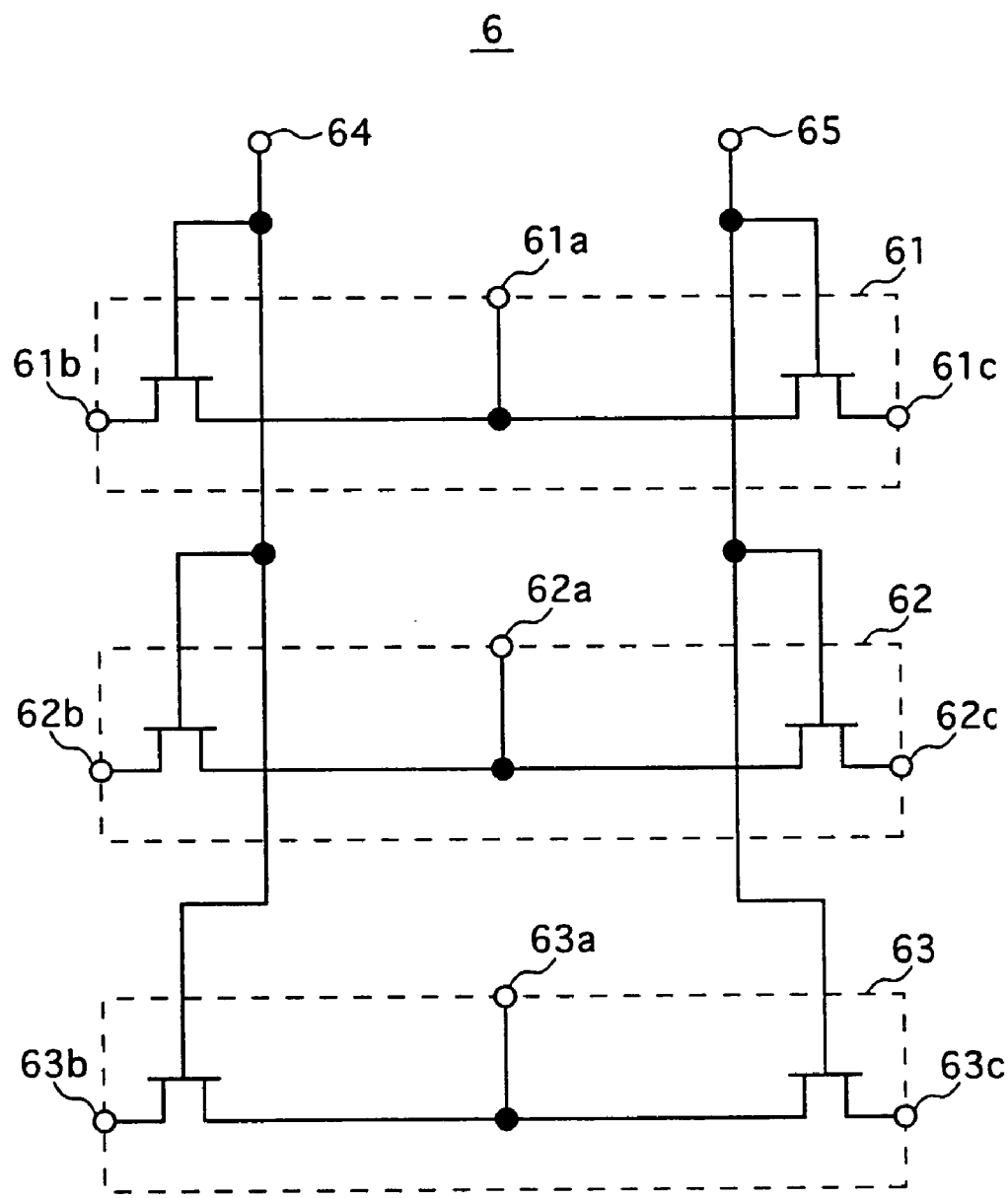
FIG. 8 shows a structure using non-contact switches in a transmission/reception switch 6.

FIG. 8 shows an example of the transmission/reception switch 6 with a structure that uses non-contact switches. The transmission/reception switch 6 is composed of internal switches 61, 62 and 63 that are SPDT switches that gang switch by sharing gate terminals 64 and 65. Furthermore, each of the internal switches 61, 62 and 63 is composed of two transistors. In the internal switch 61, a terminal 61a is connected to an up mixer, a terminal 61b is connected via the BPF 44 to an input terminal of the transmission/reception amplifier 13, and a terminal 61c is grounded. In the internal switch 62, a terminal 62a is connected to the output terminal of the transmission/reception amplifier 13, a terminal 62b is connected to an input terminal of the final amplifier 14, and a terminal 62c is connected to a down mixer side of the circuit. In the internal switch 63, the terminal 63a is connected to an antenna unit 5 side of the circuit, a terminal 63b is connected via the BPF 46 to the output terminal of the final amplifier 14, and a terminal 63c is connected via the BPF 44 to the input terminal of the transmission/reception amplifier 13.

Note that the terminals 61b and 63c are directly connected to each other by a transmission path in the transmission/reception switch 6, and connect to the input terminal of the transmission/reception amplifier 13 from a branch point on a transmission path that directly connects the terminal 61b and the terminal 63c.

The gate terminals 64 and 65 connect to the controller 3. A gate voltage is applied to the gate terminal 64 during transmission and the gate terminal 65 during reception, and in each of the internal switches 61, 62 and 63, a signal is transmitted by the transistor on the side of the gate terminal to which the gate voltage is being applied.

Specifically, when a gate voltage is applied to the gate terminal 64, in the internal switch 61, the circuit is conductive between the terminal 61a and the terminal 61b and non-conductive between the terminal 61a and the terminal 61c, and the signal is transmitted from the up mixer side of the circuit to the input terminal of the transmission/reception amplifier 13. In the internal switch 62, the circuit is conductive between the terminal 62a and the terminal 62b and non-conductive between the terminal 62a and the terminal 62c, and the signal is transmitted from the output terminal of the transmission/reception amplifier 13 to the input terminal of the final amplifier 14. In the internal switch 63, the circuit is conductive between the terminal 63a and the terminal 63b and non-conductive between the terminal 63a and the terminal 63c, and the signal is transmitted from the output terminal of the final amplifier 14 to the antenna unit 5 side of the circuit. When a gate voltage is applied to the gate terminal 65, in the internal switch 61, the portion between the terminal 61a and the terminal 61c is conductive, the portion between the terminal 61a and the terminal 61b is non-conductive, and input from the up mixer is grounded. In the internal switch 62, the portion between the terminal 62a and the terminal 62c is conductive, the portion between the terminal 62a and the terminal 62b is non-conductive, and the signal is transmitted from the output-terminal of the transmission/reception amplifier 13 to the down mixer side of the circuit. In the internal switch 63, the portion between the terminal 63a and the terminal 63c is conductive, the portion between the terminal 63a and the terminal 63b is non-conductive, and the signal is transmitted from the antenna unit 5 side of the circuit to the input terminal of the transmission/reception amplifier 13.

Note that isolation between the terminals 61b and 61c, between the terminals 62b and 62c, and between the terminals 63b and 63c can be ensured by applying a gate voltage to only one of the gate terminal 64 and the gate terminal 65.

Furthermore, the terminals 61b and 63c are directly connected by a transmission path in the transmission/reception switch 6, however when one of the terminal 61b and the terminal 63c conducts, the other does not conduct. Therefore, isolation can be ensured of a signal input from any of the terminals to the input terminal of the transmission/reception amplifier 13 via the branch point on the transmission path.

The final amplifier 14 shown in FIG. 7, is more capable of linearly amplifying a high power signal than is the transmission/reception amplifier 13. The input terminal of the final amplifier 14 is connected to the terminal 62b of the transmission/reception switch 6, and the output terminal is connected to the BPF 46. During transmission, the final amplifier 14 receives input of a signal that has been amplified by the transmission/reception amplifier 13, further amplifies the signal, and outputs the amplified signal to the antenna unit 5 via the BPF 46. The BPF 46 removes unnecessary band components from the signal output from the final amplifier 14.

Figure 1:
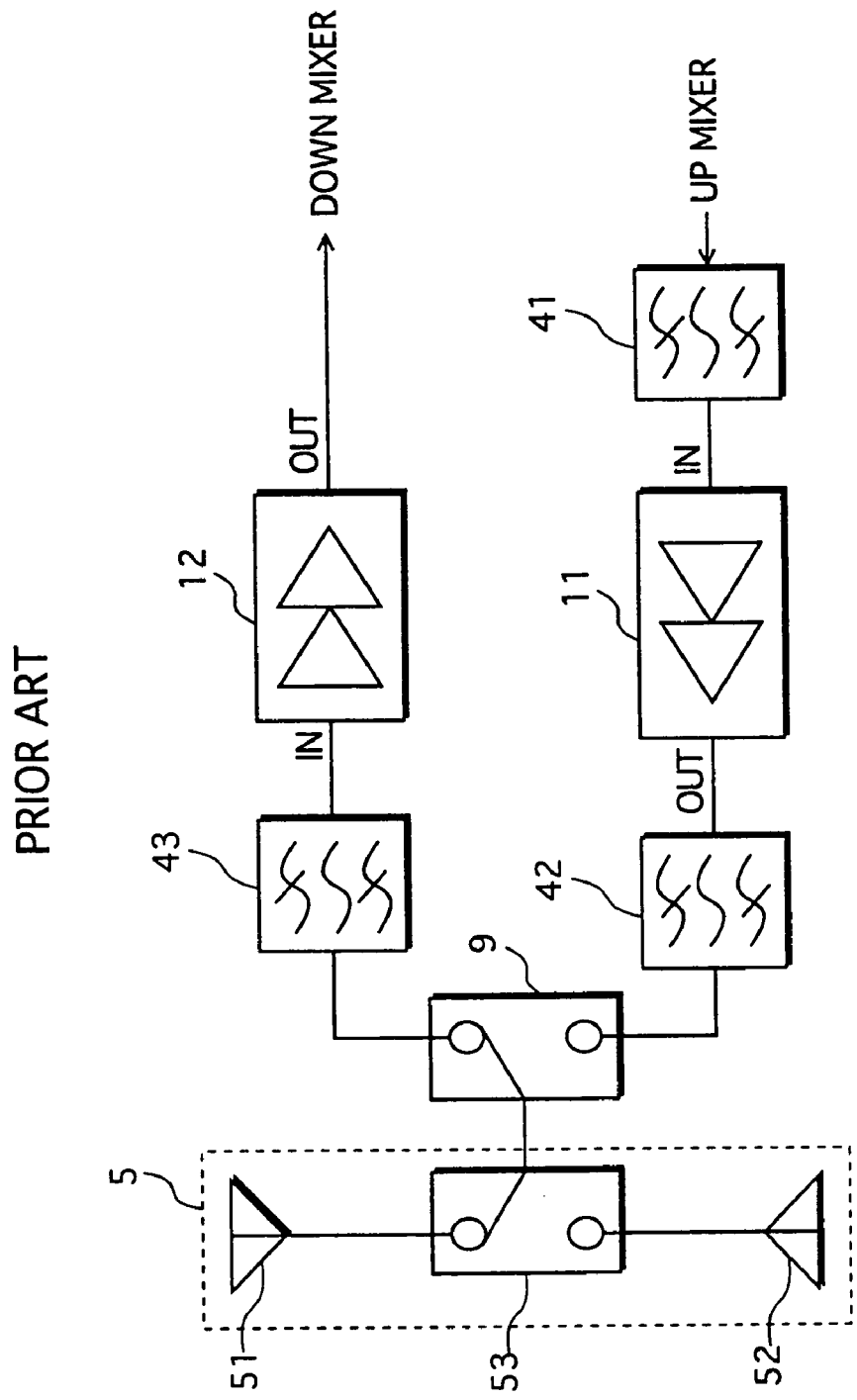
FIG. 1 is a block drawing showing the structure of a conventional high frequency circuit.

According to the stated structure, although the number of components is the same as in the conventional circuit structure shown in FIG. 1, by using the transmission/reception amplifier 13 as an LNA during reception and also during transmission as part of a multistage PA having a high saturation output, the total number of active elements used in the amplifiers in the high frequency device as a whole is reduced, and the cost is also reduced. Consequently, the stated structure can be used to reduce the cost of a high frequency device not only in a wireless LAN, but also in other wireless communication systems, such as a mobile telephone, that require a greater output power from the PA than the LNA.

The following describes a high frequency device of a third embodiment, as another embodiment of the present invention.

Figure 9:
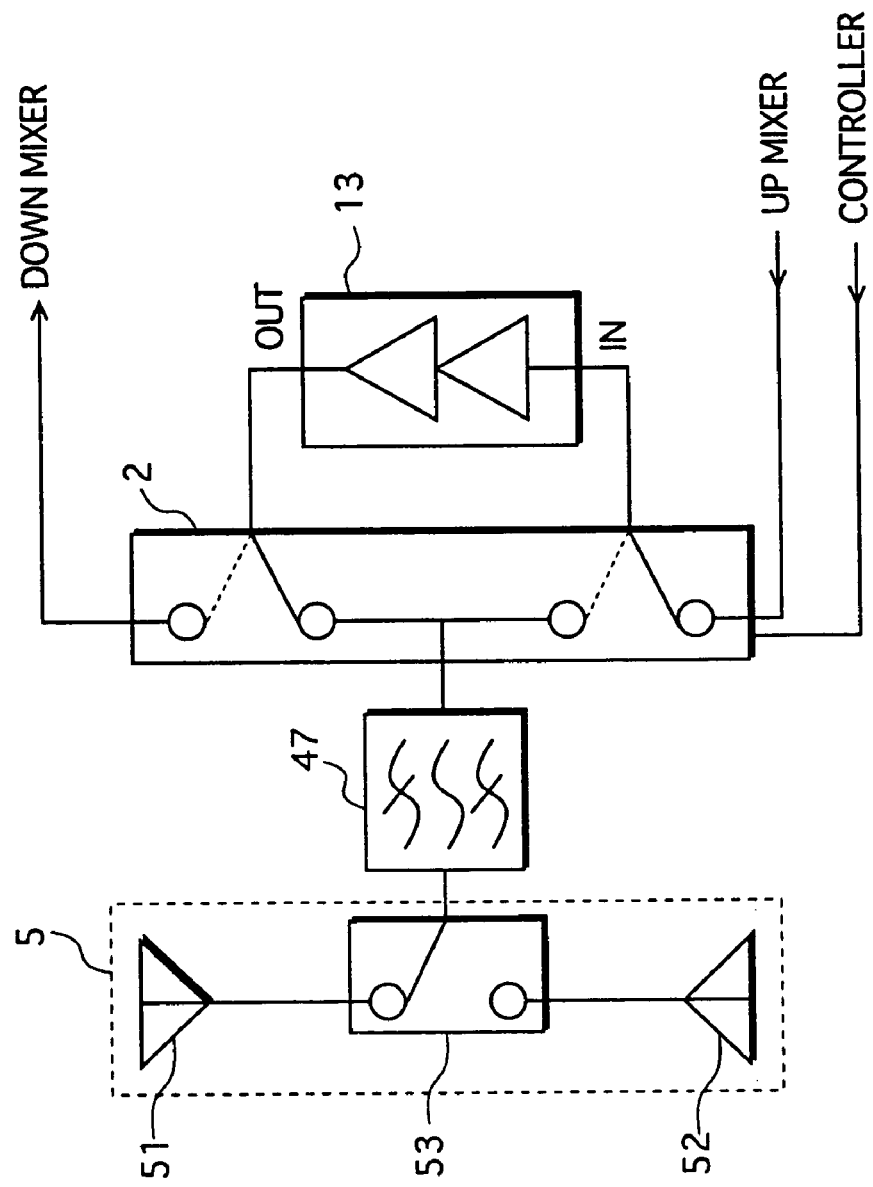
FIG. 9 shows a high frequency device of a third embodiment of the present invention.

FIG. 9 shows the high frequency device of the third embodiment of the present invention. The high frequency device of the third embodiment is suitable for a wireless communication system in which a signal input into the transmission/reception amplifier 13 during transmission is small enough that a bandpass filter is not required. In the structure of the third embodiment, the BPFs 44 and 45 of the first embodiment are absent, while a BPF 47 is added.

In the transmission/reception switch 2, the terminal 21c of the internal switch 21 and the terminal 22b of the internal switch 22 are connected by a transmission path in the transmission/reception switch 2. Furthermore, the terminal 21c and the terminal 22b are connected to the BPF 47 by a common transmission path from the branch point on the transmission path that connects the two terminals.

The BPF 47 is used in both transmission and reception. One terminal of the BPF 47 is connected to a branch point on the transmission path that connects the terminal 21c and the terminal 22b of the transmission/reception switch 2, and the other terminal is connected to the antenna unit 5.

According to the stated structure, the number of components used for amplifiers and filters is significantly reduced compared to a conventional circuit structure, and cost is reduced.

The following describes a high frequency device of a fourth embodiment, as yet another embodiment of the present invention.

Figure 10:
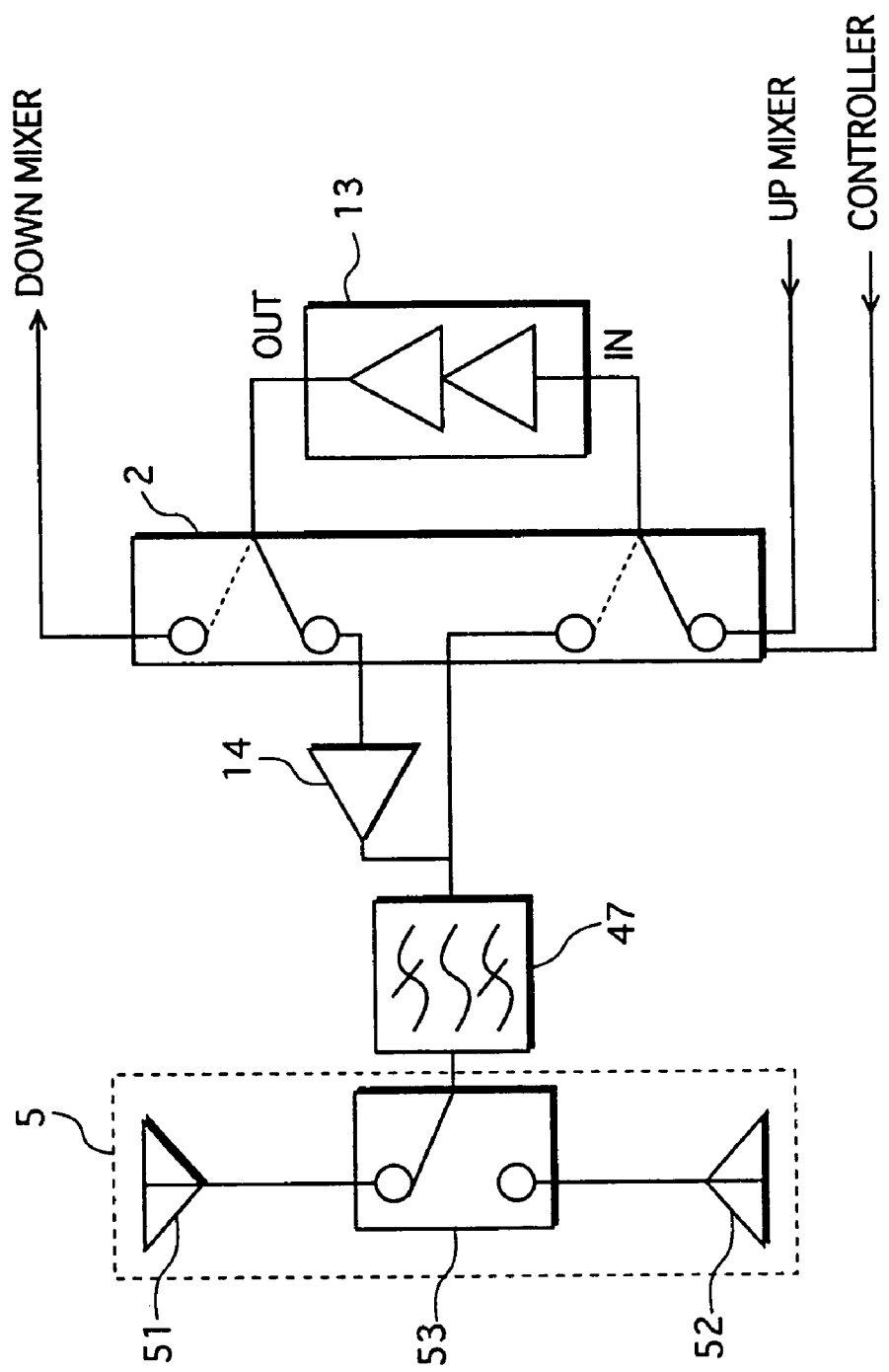
FIG. 10 shows a high frequency device of a fourth embodiment of the present invention.

FIG. 10 shows the high frequency device of the fourth embodiment of the present invention. The high frequency device of the fourth embodiment is suitable for use in a wireless communication system in which a signal input into the transmission/reception amplifier 13 during transmission is small enough not to require a bandpass filter, and in which a greater output power is required from the PA than the LNA. The high frequency device of the fourth embodiment has the final amplifier 14 in addition to the structure of the high frequency device of the third embodiment. The terminal 22b of the transmission/reception switch 2 and the input terminal of final amplifier 14 are connected, and the output terminal of the final amplifier 14 and the terminal 21c of the transmission/reception switch 2 are connected to one terminal of the BPF 47.

According to the stated structure, the number of components is reduced significantly compared to a conventional circuit structure, and therefore cost is reduced. Furthermore, by using the circuit structure of the present embodiment, a significant reduction in the number of components and in cost can be achieved not only in a wireless LAN system, but also in other wireless communication systems, such as a mobile telephone, that require a greater output power from the PA than the LNA.

The following describes a high frequency device of a fifth embodiment, as a further embodiment of the present invention.

Figure 11:
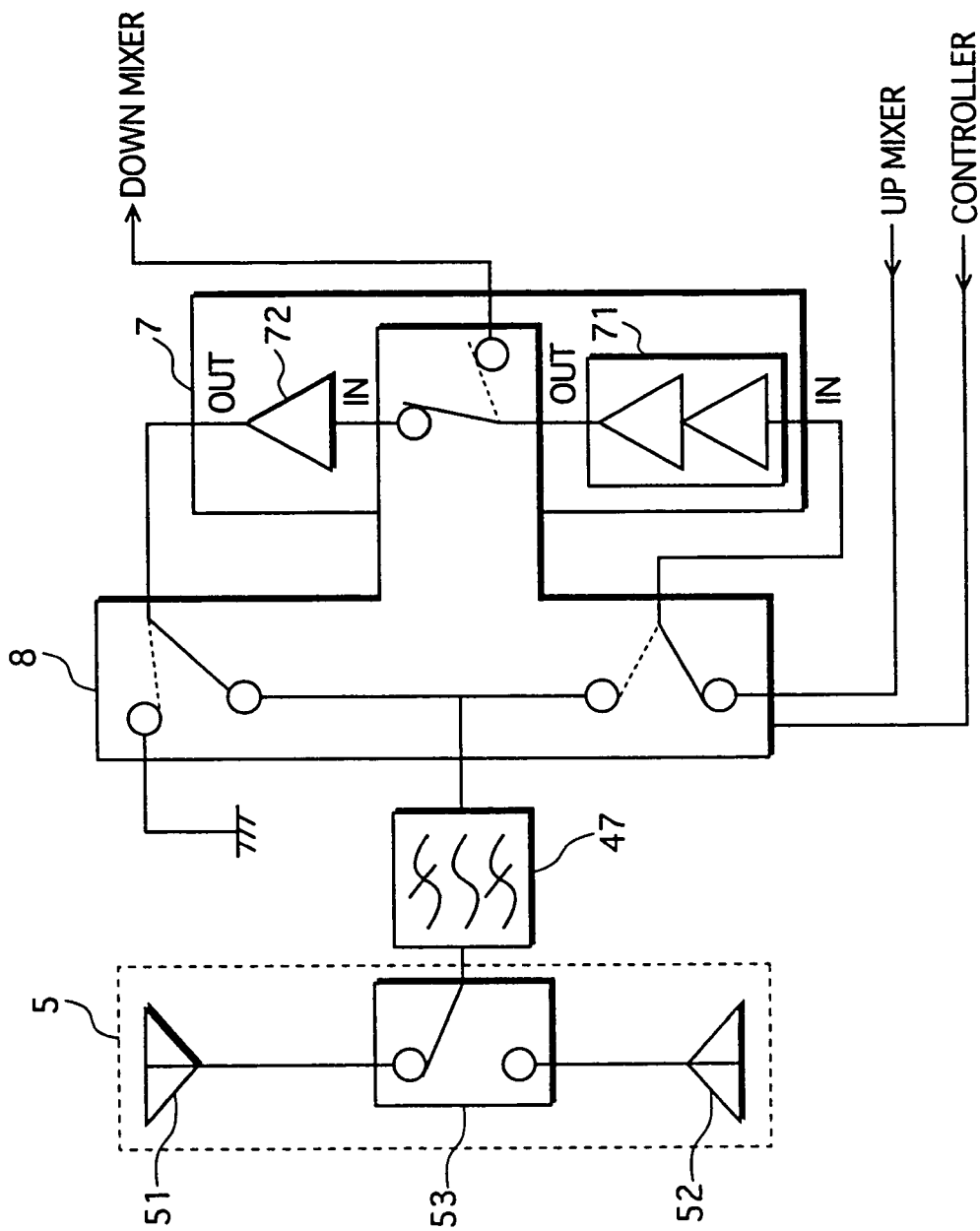
FIG. 11 shows a high frequency device of a fifth embodiment of the present invention.

FIG. 11 shows the high frequency device of the fifth embodiment of the present invention. In FIG. 11, a transmission/reception amplifier 7 is a multistage amplifier composed of active components arranged in a transistor array, and includes first/middle stage amplifier 71 and a final stage amplifier 72. The transmission/reception amplifier 7 linearly amplifies and outputs an input signal.

The transmission/reception switch 8 is composed of contact switches such as relays, or non-contact switches such as transistors, and under the control of the controller 3, during transmission, switches so as to connect the input terminal of the first/middle stage amplifier 71 of the transmission/reception amplifier 7 to the up mixer, connect the output terminal of the first/middle stage amplifier 71 to the input terminal of the final stage amplifier 72, and connect the output terminal of the final amplifier 72 to the BPF 47. Conversely, during reception, the transmission/reception switch 8 gang switches so as to connect the input terminal of the first/middle stage amplifier 71 to the BPF 47, and connect the output terminal of the first/middle stage amplifier 71 to the down mixer.

Note that during reception the transmission/reception switch 8 may switch so as to connect the output terminal of the first/middle stage amplifier 71 of the transmission/reception amplifier 7 to the down mixer, connect the input terminal of the first/middle stage amplifier 71 to the BPF 47, and further connect the output terminal of the final amplifier 72 to the ground terminal. This prevents noise from the final amplifier 72 from adversely affecting the reception signal from the antenna unit 5.

FIG. 12 shows an example of the transmission/reception switch 8 with a structure that uses non-contact switches. The transmission/reception switch 8 is composed of an internal switches 81, 82, and 83, each of which includes two transistors. The internal switches 81, 82 and 83 gang switch by sharing a gate terminal 84 and a gate terminal 85. In the internal switch 81, a terminal 81*a* is connected to an input terminal of the first/middle stage amplifier 71 of the transmission/reception amplifier 7, a terminal 81*b* is connected to the up mixer, and a terminal 81*c* is directly connected to a terminal 83*b* of the internal switch 83 by a transmission path in the transmission/reception switch 8, and further connected to the BPF 47 via a branch point of the transmission path. In the internal switch 82, a terminal 82*a* is connected to an output terminal of the first/middle stage amplifier 71 of the transmission/reception amplifier 7, a terminal 82*b* is connected to the input terminal of the final amplifier 72 of the transmission/reception amplifier 7, and a terminal 82*c* is connected to the down mixer. In the internal switch 83, a terminal 83*a* is connected to the output terminal of the final stage amplifier 72 of the transmission/reception amplifier 7, the terminal 82*b* is connected, as described above, to the BPF 47 via the described branch point on the transmission path that connects the terminal 81*c*, and a terminal 83*c* is grounded. The gate terminals 84 and 85 are connected to the controller 3. During transmission, a gate voltage is applied to the gate terminal 84, and during reception, a gate voltage is applied to the gate terminal 85. The signal is transmitted by the transistor on the side to which the gate voltage is applied.

According to the stated structure, the number of components that use active elements can be reduced in a high frequency device in which a greater output power is required from the PA than the LNA.

Note that in the embodiments of the present invention examples of the transmission/reception switches 2, 6 and 8 being composed of non-contact semiconductor switches are given, however any other type of switches may be used as long as the structure is one of high isolation. The type of switches that may be used include not only non-contact switches such as FETs, diodes, bipolar transistors and MOSFETs, but also mechanical switches such as contact leads and relays.

The wireless communication device of the present invention is not limited to that described in the embodiments. Cases such as the following are included in the present invention.

(1) The present invention may be a high frequency amplification method that includes operations that realize the described structure, specifically, a method that includes a step of, during transmission, connecting the input terminal of the amplifier to the up mixer side of the circuit and connecting the output terminal of the amplifier to the antenna side of the circuit, and, during reception, connecting the input terminal of the amplifier to the antenna side of the circuit and connecting the output terminal of the amplifier to the down mixer of the circuit; and a step of amplifying a signal input into the amplifier.

(2) In the embodiments of the present invention, the antenna switch 53 may be formed integrally, on one semiconductor, with any of the transmission/reception switches 2, 6 and 8. Furthermore, when a bandpass filter is required, a terminal for extracting the RF signal from the circuit formed on the semiconductor may be provided. This enables a high frequency device that is composed of two active elements: a switch unit and an amplifier unit.

Furthermore, a structure in which the antenna unit 5 does not have a diversity function, and does not have the antenna switch 53, is possible.

(3) The present invention may be an MMIC (microwave monolithic integrated circuit) that is the transmission/reception switch and the amplifier described in the embodiments formed integrally on a semiconductor. This structure enables the circuit structure of the high frequency circuit to be formed on one chip, and significantly reduces the mounting area of the chip.

(4) The present invention may be a mobile telephone inside which the high frequency device of any of the first to fifth embodiments is included.

(5) The present invention may be any combination of the described embodiments and the above-described (1) to (4).

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wireless communication apparatus that communicates in a wireless LAN with use of time division duplex, comprising:

a modulation/demodulation circuit that, during transmission, modulates a baseband signal to an intermediate frequency signal, and, during reception, demodulates an intermediate frequency signal to a baseband signal;

a mixer circuit that is connected to an intermediate frequency circuit and a high frequency circuit, and with use of a superheterodyne method, during transmission, raises the intermediate frequency signal to a high frequency signal, and during reception, lowers a high frequency signal to the intermediate frequency signal;

the high frequency circuit of which, during transmission, an input is connected to a mixer circuit and an output is connected to an antenna circuit, and, during reception, the input is connected to the antenna circuit and the output is connected to the mixer circuit, and that, during transmission and reception, amplifies an input high frequency signal and outputs a resultant amplified signal; and an antenna circuit that emits and receives carrier waves.

2. A high frequency device that amplifies a high frequency signal to be transmitted and a received high frequency signal, in a wireless communication system in which time division duplex is used, comprising:

one high frequency amplification unit; and a switch unit operable to switch to a transmission connection state during transmission and to a reception connection state during reception, wherein in the transmission connection state, the switch unit connects an input of the high frequency amplification unit to an up mixer, the up mixer raising an intermediate frequency signal to a high frequency signal, and connects an output of the high frequency amplification unit to an antenna circuit, and in the reception connection state, the switch unit connects the input of the high frequency amplification unit to the antenna circuit, and connects the output of the high frequency amplification circuit to a down mixer, the down mixer lowering a high frequency signal to an intermediate frequency signal.

3. The high frequency device of claim 2, wherein
the switch unit includes a first switch and a second switch, the first switch, in the transmission connection state, receiving input of a signal from the up mixer and outputting the signal to the input of the high frequency amplification unit, and, in the reception connection state, receiving input of a signal from the antenna circuit and outputting the signal to the input of the high frequency amplification unit, and the second switch, in the transmission connection state, receiving input of a signal from the output of the high frequency amplification unit and outputting the signal to the antenna circuit, and, in the reception connection state, receiving input of a signal from the output of the high frequency amplification unit and outputting the signal to the down mixer.

4. The high frequency device of claim 3, further comprising:

a final high frequency amplification unit provided on a transmission path via which a signal is transmitted from the second switch to the antenna circuit in the transmission connection state, and operable to amplify the signal transmitted via the path.

5. The high frequency device of claim 4, wherein
the high frequency amplification unit, the switch unit, and the final high frequency amplification unit are formed on one semiconductor chip.

6. The high frequency device of claim 3, further comprising:

one transmission/reception filter unit provided on a common section of the transmission path via which a signal is transmitted from the second switch to the antenna circuit in the transmission connection state, and a transmission path via which a signal is transmitted from the antenna circuit to the first switch in the reception connection state, and operable to attenuate, from a signal transmitted via the section, a signal of unnecessary bandwidth.

7. The high frequency device of claim 3, further comprising:

an input signal filter unit provided on a transmission path via which a signal is transmitted from the first switch to the high frequency amplification unit, and operable to attenuate, from the signal transmitted via the transmission path, a signal of unnecessary bandwidth; and an output signal filter unit provided on a transmission path via which a signal is transmitted from the high frequency amplification unit to the second switch, and operable to attenuate, from the signal transmitted via the transmission path, a signal of unnecessary bandwidth.

8. The high frequency device of claim 3, wherein
the high frequency amplification unit and the switch unit are formed on one semiconductor chip.

9. The high frequency device of claim 2, wherein
the high frequency amplification unit and the switch unit are formed on one semiconductor chip.

10. The high frequency device of claim 2, wherein
the antenna circuit has a diversity function.

11. A high frequency amplification method that amplifies a high frequency signal to be transmitted and a received high frequency signal with use of a high frequency amplification device, in a wireless communication system in which time division duplex is used, the method comprising:

a connection step of, during transmission, gang connecting an input of the high frequency amplification unit to an up mixer, the up mixer raising an intermediate frequency signal to a high frequency signal, and an output of the high frequency amplification unit to an antenna circuit, and during reception, gang connecting the input of the high frequency amplification unit to the antenna circuit, and the output of the high frequency amplification circuit to a down mixer, the down mixer lowering a high frequency signal to an intermediate frequency signal; and an amplification step of amplifying a signal input into the high frequency device.

12. A mobile telephone that performs wireless communication in a wireless communication system in which time division duplex is used, comprising:

one high frequency amplification unit; and a switch unit operable to switch to a transmission connection state during transmission and to a reception connection state during reception, wherein in the transmission connection state, the switch unit connects an input of the high frequency amplification unit to an up mixer, the up mixer raising an intermediate frequency signal to a high frequency signal, and connects an output of the high frequency amplification unit to an antenna circuit, and in the reception connection state, the switch unit connects the input of the high frequency amplification unit to the antenna circuit, and connects the output of the high frequency amplification circuit to a down mixer, the down mixer lowering a high frequency signal to an intermediate frequency signal.

13. The mobile telephone of claim 12, wherein
the switch unit includes a first switch and a second switch, the first switch, in the transmission connection state, receiving input of a signal from the up mixer and outputting the signal to the input of the high frequency amplification unit, and, in the reception connection state, receiving input of a signal from the antenna circuit and outputting the signal to the input of the high frequency amplification unit, and the second switch, in the transmission connection state, receiving input of a signal from the output of the high frequency amplification unit and outputting the signal to the antenna circuit, and, in the reception connection state, receiving input of a signal from the output of the high frequency amplification unit and outputting the signal to the down mixer.

14. The mobile telephone of claim 13, further comprising:

a final high frequency amplification unit provided on a transmission path via which a signal is transmitted from the second switch to the antenna circuit in the transmission connection state, and operable to amplify the signal transmitted via the path.

15. The mobile telephone of claim 13, further comprising:

one transmission/reception filter unit provided on a common section of the transmission path via which a signal is transmitted from the second switch to the antenna circuit in the transmission connection state, and a transmission path via which a signal is transmitted from the antenna circuit to the first switch in the reception connection state, and operable to attenuate, from a signal transmitted via the section, a signal of unnecessary bandwidth.

* * * * *